United States Patent [19]
Smith et al.

[11] 3,745,967
[45] July 17, 1973

[54] FLOW INDICATOR

[75] Inventors: Russel G. Smith, Cincinnati; Nikolai Belaef, Fairfield, both of Ohio

[73] Assignee: Xomox Corporation, Cincinnati, Ohio

[22] Filed: Dec. 23, 1971

[21] Appl. No.: 211,532

[52] U.S. Cl. .............................. 116/117 R, 73/228
[51] Int. Cl .......................................... G01f 15/00
[58] Field of Search..................... 73/228, 328, 329, 73/326, 330, 331, 334, 325; 116/117

[56] References Cited
UNITED STATES PATENTS

| | | | |
|---|---|---|---|
| 2,371,251 | 3/1945 | Mauldin | 116/117 R |
| 2,409,430 | 10/1946 | Greenleaf | 116/117 R X |
| 2,580,928 | 1/1952 | Kehm | 116/117 R |
| 2,681,034 | 6/1954 | Mannion | 116/117 R |
| 2,735,300 | 2/1956 | Dungan et al. | 116/117 RX |
| 3,407,662 | 10/1968 | Tarbox | 73/325 |
| 3,533,287 | 10/1970 | Kruschik | 73/331 |

*Primary Examiner*—Louis J. Capozi
*Attorney*—J. Warren Kinney, Jr.

[57] ABSTRACT

The flow indicator comprises a conventional rotary plug valve body adapted easily for alternative use as a flow indicator housing, and includes simple and inexpensive constituents which lend themselves to assembly in a rapid labor-saving manner to produce an accurate, effective, safe and inexpensive visual flow indicator which is easily readable.

10 Claims, 3 Drawing Figures

PATENTED JUL 17 1973

3,745,967

FLOW INDICATOR

BACKGROUND OF THE INVENTION

The present invention relates to flow indicators which may be incorporated in a pipe system for fluids, including fluids under high pressure and those of a corrosive nature. When dangerous fluids are piped, all fittings and appurtenances of the system are preferably constructed or treated to ensure the safety of persons concerned therewith. For this purpose, the fittings may be lined with corrosion-resistant materials, or they may be formed of metals or alloys which are known to resist the deteriorative effects of the chemical solutions to which they may be exposed.

PRIOR ART

Flow indicators for incorporation in pipe systems are not broadly novel, and are disclosed in various forms by U. S. Pat. Nos. such as:

| | | |
|---|---|---|
| Dungan, et al. | 2,735,300 | Feb. 21, 1956 |
| Williamson | 1,574,460 | Feb. 23, 1926 |
| Greenleaf | 2,409,430 | Oct. 15, 1946 |
| Kehm | 2,580,928 | Jan. 1, 1952 |
| Moore, et al. | 3,185,128 | May 25, 1965 |
| Sams | 1,385,717 | July 26, 1921 |
| Farr | 3,199,488 | Aug. 10, 1965 |
| Moore | 3,415,119 | Dec. 10, 1968 |

The first four patents above listed disclose flow indicators in the form of hinged movable members which are located in the flow path of a fluid, so as to be displaced thereby when the fluid is in motion. The indicator members are exposed to view through a transparent section of the flow indicator body, so that the rate of flow of the piped fluid may be observed.

The remaining patents of the list, with the exception of Farr, disclose structures which include rotors subject to continuous turning while exposed to a flow of fluid, and in this respect are differentiated from the device of the present invention. In the Farr patent, the indicator is a stationary interceptor plate adapted to accumulate foreign substances or solids carried by a fluid medium exposed to the plate, which latter is visible through a sight glass. The Farr device does not indicate a rate of flow.

Other prior art U.S. Pat Nos. known to applicant are:

| | | |
|---|---|---|
| Lazarre | 3,375,802 | Apr. 2, 1968 |
| Mannion | 2,681,034 | June 15, 1954 |
| Farina, Jr. | 3,371,648 | Mar. 5, 1968 |
| Bailey | 2,946,156 | July 26, 1960 |
| Chatlos | 3,108,566 | Oct. 29, 1963 |
| Johnson et al. | 3,125,882 | Mar. 24, 1964 |
| Jones | 3,142,287 | July 28, 1964 |
| Olsen | 3,299,851 | Jan. 24, 1967 |

The patents of the forgoing list are considered only remotely pertinent to the present invention.

SUMMARY OF THE INVENTION

The employment of tubular sight glass sections in the fitting or in the piping, is avoided in accordance with the present invention, for the reason that such sight glasses are vulnerable to fracture under impact or internal high pressure conditions, or in the presence of heat or flame. Moreover, tubular sight glasses which might resist the conditions stated, would be very expensive.

The fitting or pipe fixture of the present invention accordingly makes use of inexpensive flat sight glasses or windows, of suitable thickness to withstand internal and external forces and other elements that might be considered destructive of sight glasses in tubular form.

Further, the device of the present invention is constructed of a conventional rotary plug valve body such as is normally employed for the control of fluid in a pipe system. By utilizing a conventional valve body, fabrication of the flow indicator is simplified and reduced in cost, and assembly or repair thereof may easily be performed on the job if necessary.

As constructed, the present flow indicator body is lined interiorly with suitable corrosion-resistant materials, and the indicator or pointer itself consists of such a material suspended simply yet effectively from a flexible hanger or diametral strut of a suspension ring likewise formed of a corrosion-resistant material. The corrosion-resistant material mentioned may be the well-known material FEP, or equivalent substance.

The sight glass or window incorporated in the indicator body structure, is reinforced by an external transparent plate of shatterproof material, of which PLEXI-GLASS is an example, for the purpose of minimizing danger from the effects of fluid leakage in the event of a crack in the transparent plate glass. In this connection, a vent is provided between the internal and external transparent members, to preclude transmission of shock from one to the other in the event of breakage of one of said members and to allow venting of fluid away from face of observer in the event the plate glass may crack at the moment of observation.

A primary object of the invention is to provide a safe and effective flow indicator simply and inexpensively constructed to withstand the destructive effects of corrosive fluids in a pipe system which incorporates the flow indicator.

DESCRIPTION OF THE PREFERRED EMBODIMENT

Figure 1:
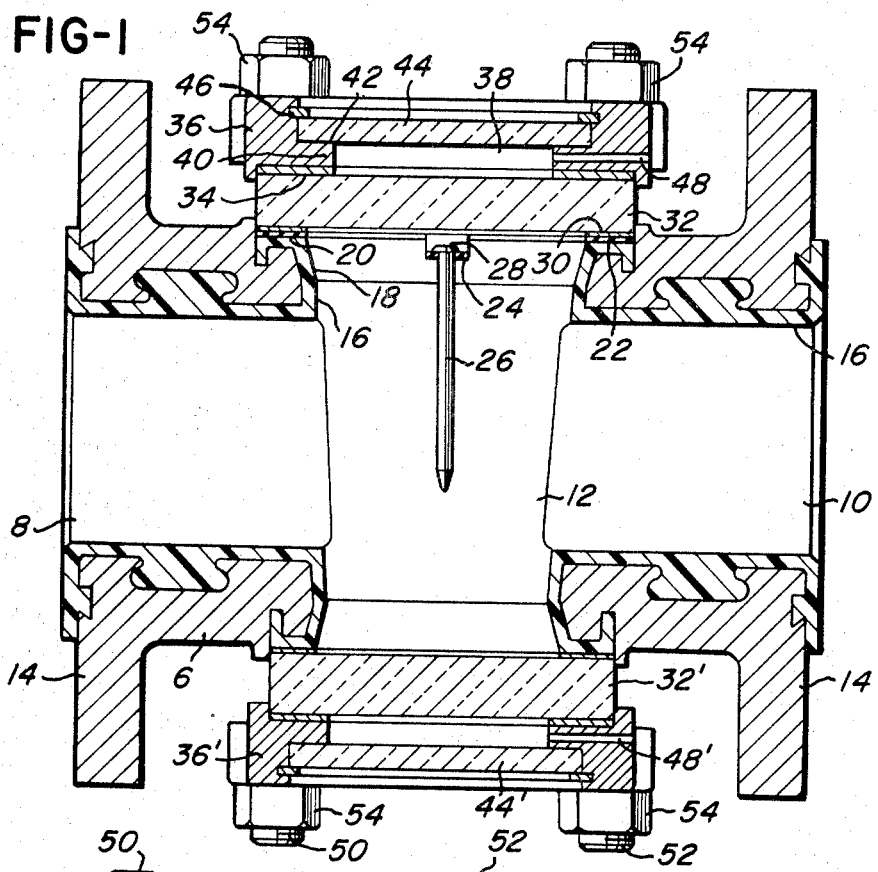
FIG. 1 is a vertical section of a flow indicator incorporating the improvements of the present invention.

Body 6 is a conventional metal plug valve body having an inlet port 8 and an outlet port 10. Intermediate the ports 8 and 10, the body incorporates the usual plug chamber 12, which in the present instance is not provided with a valve plug. The plug chamber may be either tapered, as shown, or cylindrical of form, and its major axis is preferably at right angles to the direction of fluid flow through the ports 8 and 10.

The body 6 may include means, such as flanges 14, 14, whereby the body may be secured in leak-proof fashion between two pipe sections which feed and deliver a fluid under pressure through the ports 8 and 10. If the fluid conveyed is corrosive, the ports 8 and 10 and portions of plug chamber 12, are furnished with a corrosion-resistant coating or lining 16. A suitable material for coating or lining the interior of body 6, is a material of the character of TEFLON, or FEP.

Chamber 12 has an annular upper end portion 18 providing an annular seat 20 concentric with the chamber axis. Upon the annular seat 20 is supported a flat suspension ring 22 which is substantially open except for a diametral strut or transverse hanger member 24 bridging the ring along a diameter thereof. At its center, the strut or hanger member 24 is pierced or perforated vertically to receive the shank of elongate pointer or indicating member 26 which hangs from the strut by an enlarged head 28 formed on one end thereof. The opposite swinging end of the pointer or member 26, is located in the flow path of fluid passing through the ports 8 and 10.

Pointer or indicating member 26 is preferably in the form of a rigid light-weight rod or bar of FEP, TEFLON, or the like, provided with a head or knob such as 28 serving as a suspension means therefor. The strut or hanger member 24 is flexible, and may sag slightly as shown, under the weight of the pointer or indicator member. The suspension ring including the strut 24, is formed of a corrosion-resistant sheet material of the character of TEFLON or FEP.

With further reference to FIG. 1, ring 22 is seen to support a flat sealing ring 30, and upon ring 30 is supported a thick transparent disc 32 of glass through which may be seen the pointer or member 26. An open gasket ring 34 overlies a marginal portion of glass disc 32, leaving the central portion of disc 32 clear for observance of the pointer. Disc 32 may be considered a sight glass or primary transparent window element which exposes the pointer 26 to view from the exterior of body 6.

Upon gasket ring 34 is superposed an upper clamp head 36 having a central opening 38 bounded by an annular flange 40 that rests flatly upon gasket ring 34. A shoulder 42 of flange 40 provides a seat upon which is supported a secondary window disc or transparent plate 44 which, by preference though not of necessity, is of a shatter-proof material such as PLEXIGLASS, for example. The secondary window disc may be held in place upon seat 42 in any suitable manner, as by means of an internal snap ring 46 engaging a wall of the clamp head.

It will be noted that the transparent discs 44 and 32 are spaced from one another in substantial parallelism. The space between the discs is vented to atmosphere by means of a small passageway or vent 48 formed radially in the material of the clamp head. The vent serves to relieve pressure between the discs 44 and 32 in the event that the plate glass cracks and develops leakage of fluid under pressure. That is, venting to the side protects observer in case the glass cracks, and relieves high pressure buildup against plastic plate until the replacement is effected. The vent serves also to preclude fogging of the window discs.

At the lower end of chamber 12, a closure is effected by means similar to those at the upper end, excepting that no suspension ring such as 22 is employed. It will appear, therefore, that the transparent discs 32' and 44' correspond to the discs 32 and 44, respectively, and that they are mounted in like manner with relation to a lower clamp head 36'. Gaskets and a snap ring are utilized in mounting the discs 32' and 44' as previously explained, and the space between the discs is relieved by a vent 48'.

The upper and lower window assemblies at opposite ends of chamber 12, may be held in fixed position upon body 6 by means of four or more long bolts 50, 52 which pass through holes in both of the heads 36, 36', and carry clamping nuts 54 at their opposite ends. The clamping nuts keep the several seal rings and gaskets at the window elements under firm compression, to preclude leakage of fluid from chamber 12 to the exterior of the flow indicator body.

Figure 2:
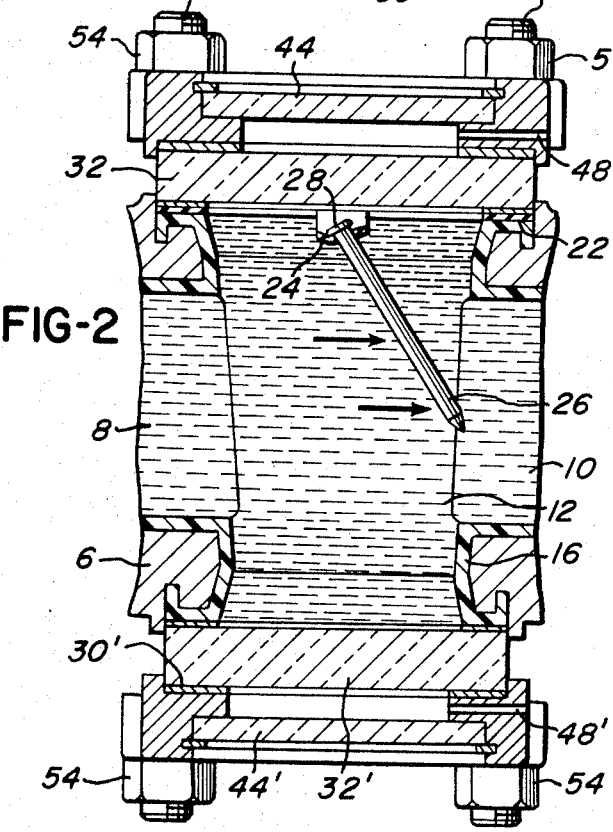
FIG. 2 is a fragmentary view showing the structure of FIG. 1, with a flow of fluid activating the indicator.
Figure 3:
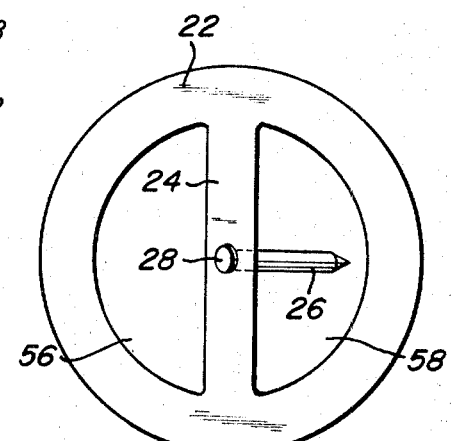
FIG. 3 is a plan view of a pointer and suspension ring assembly forming a detail of the invention.

When as in FIG. 2, a flow of fluid is passing in one direction through the ports 8, 10, the force of the flow will bias or incline the pointer 26 to one side of the axis of chamber 12, to a degree of inclination corresponding to the velocity of flow. The inclination of the pointer can be observed through the upper windows or through the lower windows, as may be desirable or convenient to the observer.

Under poor light conditions the pointer advantageously may be observed through the upper windows, while a flashlight or other light source is used to illuminate chamber 12 through the lower windows, or vice versa.

It is to be noted that all parts of the flow indicator which are exposed to the fluid therein, are immune to attack by the fluid if it is corrosive. Also, wear or destruction of moving parts is reduced to a minimum, and quite obviously, swinging movement of pointer 26 at its head 28 imposes a negligible amount of wear upon the flexible strut 24 of suspension ring 22. If the fluid passing through the device is substantially non-corrosive, pointer 26 may be formed of ferrous or non-ferrous metal.

To ensure maximum visibility of pointer 26 through the windows, the suspension ring 22 is clamped and fixed relative to body 6, with its pointer-supporting strut 24 extended transversely to the direction of flow. The pointer accordingly may be readily observed through one or the other of the sight openings 56, 58 at opposite sides of the strut, while flow of fluid is in progress.

The plug valve body upon which the flow indicating elements are assembled, may be cast or formed of any suitable material, and in some instances may include screwthreads at its ports, rather than flanges 14, for effecting fluid-tight connections in a pipe system. In the larger and heavier forms of the device, the flange connections may be preferred.

We claim:

1. A flow indicator comprising a hollow valve body having a fluid inlet port, a fluid outlet port, and an intermediate transverse chamber with at least one open end, said end being circumscribed by an annular seat located exteriorly of the body; a main transparent window element mounted upon the body in substantial covering relationship to said seat, closing the open end of said transverse chamber; suspension means in said valve body, including a flexible band extending transversely across said chamber, an elongate flow indicating pointer suspended at one end thereof from said flexible transverse band with the other end thereof freely swingable within said chamber toward and from the chamber axis in response to the flow of fluid through said body wherein said suspension means for the pointer includes an annular gasket disposed upon said annular seat, said transverse band formed integrally at is opposite ends with said gasket on diametrically opposite sides thereof.

2. The device as defined by claim 1, wherein said intermediate transverse chamber is substantially cylindrical of form and has open upper and lower ends, a transparent main window element closes each open end, and the transparent window elements are in the form of thick substantially planar discs whose planes are disposed substantially at right angles to the axis of said intermediate transverse chamber.

3. The device as defined by claim 2, wherein the combination includes a pair of secondary transparent window elements each supported in spaced parallelism with one of the main window elements, and means for venting the space between the main and secondary window elements.

4. The device as defined by claim 3, wherein said secondary window elements are formed of a material of the class of Plexiglass.

5. The device as defined by claim 1, wherein the hollow body comprises the body of a rotary plug valve.

6. The device as defined by claim 5, wherein the entire interior surface of the hollow body is lined with a corrosion resistant material.

7. The device as defined by claim 6, wherein said suspension means and said pointer are fabricated from corrosion resistant material.

8. The device as defined in claim 6, wherein the corrosion resistant material comprises FEP.

9. The device as defined by claim 2, wherein the pointer and the suspension means therefor are formed of FEP.

10. The device as referred to in claim 1, wherein the suspension means for the pointer is an FEP circular gasket clamped on said annular seat, with a diametral band connecting opposite sides of the gasket I.D., said indicator connected to said band medially of the ends of the band and in the path of flowing fluid.

* * * * *